United States Patent
Wright et al.

(10) Patent No.: US 11,074,465 B2
(45) Date of Patent: Jul. 27, 2021

(54) SYSTEMS AND METHODS FOR RIDE SHARE MONITORING

(71) Applicant: Gentex Corporation, Zeeland, MI (US)

(72) Inventors: Thomas S. Wright, Holland, MI (US); Steven L. Geerlings, Holland, MI (US); Matthew W. Remijn, Grand Rapids, MI (US); Darin D. Tuttle, Byron Center, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/718,639

(22) Filed: Dec. 18, 2019

(65) Prior Publication Data
US 2020/0202148 A1    Jun. 25, 2020

Related U.S. Application Data

(60) Provisional application No. 62/782,985, filed on Dec. 20, 2018.

(51) Int. Cl.
*G06K 9/00* (2006.01)
*B60W 40/08* (2012.01)

(52) U.S. Cl.
CPC ......... *G06K 9/00832* (2013.01); *B60W 40/08* (2013.01); *B60W 2040/0809* (2013.01)

(58) Field of Classification Search
CPC .................................................. G06K 9/00832
See application file for complete search history.

(56) References Cited

U.S. PATENT DOCUMENTS

| | | | |
|---|---|---|---|
| 8,703,500 B2 | 4/2014 | Zang et al. | |
| 9,452,989 B2 | 9/2016 | Zang et al. | |
| 9,823,193 B2 | 11/2017 | Zang et al. | |
| 2010/0043529 A1 | 2/2010 | Wang et al. | |
| 2012/0122075 A1 | 5/2012 | Call et al. | |
| 2014/0235493 A1 | 8/2014 | Zang et al. | |
| 2016/0361972 A1 | 12/2016 | Blackley | |
| 2018/0074495 A1* | 3/2018 | Myers | G06Q 50/30 |
| 2018/0224849 A1* | 8/2018 | Gordon | G06K 9/6201 |
| 2018/0330475 A1* | 11/2018 | Tokatyan | G06K 9/00832 |
| 2019/0095714 A1* | 3/2019 | Wilcox | G01S 17/89 |
| 2020/0043030 A1* | 2/2020 | Mangal | G06K 9/00832 |

FOREIGN PATENT DOCUMENTS

| | | |
|---|---|---|
| CN | 107705180 A | 2/2018 |
| DE | 102016215525 A1 | 2/2018 |

* cited by examiner

*Primary Examiner* — Travis R Hunnings
(74) *Attorney, Agent, or Firm* — Price Heneveld LLP; Bradley D. Johnson (57) ABSTRACT

A detection system for a vehicle comprises at least one detection device configured to detect conditions in a passenger compartment of the vehicle and a controller. The controller is in communication with the at least one detection device. The controller is configured to monitor data from the at least one detection device prior to an entry of an occupant. Based on the data from the at least one detection device, the controller is further configured to identify at least one change in the passenger compartment of the vehicle. The at least one change in the passenger compartment indicates at least one of an item left behind in the passenger compartment, damage to the vehicle, and contamination of the vehicle.

20 Claims, 5 Drawing Sheets

SYSTEMS AND METHODS FOR RIDE SHARE MONITORING

CROSS-REFERENCE TO RELATED APPLICATIONS

This application claims priority under 35 U.S.C. § 119(e) and the benefit of U.S. Provisional Application No. 62/782,985 entitled SYSTEMS AND METHODS FOR RIDE SHARE MONITORING, filed on Dec. 20, 2018, by Thomas S. Wright et al., the entire disclosure of which is incorporated herein by reference.

TECHNOLOGICAL FIELD

The present invention generally relates to a vehicle detection system and, more particularly, to light assemblies configured to disinfect a passenger compartment.

BACKGROUND OF THE INVENTION

Passenger compartments in vehicles, especially those in autonomous or shared vehicles, may introduce a number of considerations that may not be considered in vehicles that are operated by human operators. For example, without an operator, there may not be adequate oversight to clean and report damage or issues related to vehicles. For these reasons, autonomous vehicles may accumulate contaminants or deteriorate in condition over time resulting from use with lack of oversight. Additionally, the lack of operators may similarly limit the likelihood that items left behind in the vehicle are identified or returned. The disclosure provides for a system that resolves numerous issues related to the operation of autonomous or ride-share vehicles.

SUMMARY OF THE DISCLOSURE

According to one aspect of the present disclosure, a detection system for a vehicle is disclosed. The system comprises at least one detection device configured to detect conditions in a passenger compartment of the vehicle and a controller. The controller is in communication with the at least one detection device. The controller is configured to monitor data from the at least one detection device prior to an entry of an occupant. Based on the data from the at least one detection device, the controller is further configured to identify at least one change in the passenger compartment of the vehicle as a result of an occupancy of the vehicle.

According to another aspect of the present disclosure, a method for monitoring a use of a vehicle is disclosed. The method comprises detecting conditions in a passenger compartment of the vehicle with at least one detection device and monitoring detection data from the detection device prior to an entry of a passenger. The method further comprises identifying an entry of an occupant and identifying a change in the detection data related to an occupancy of the occupant. The method further comprise in response to the change in the detection data, identifying at least one of a contamination of the passenger compartment, a left-behind item, and damage to the vehicle.

According to yet another aspect of the present disclosure, a detection system for a vehicle comprising is disclosed. The detection system comprises at least one detection device configured to detect conditions in a passenger compartment of the vehicle. The at least one detection device comprises a chemical detection sensor configured to detect a chemical in the passenger compartment. A controller is in communication with the at least one detection device. The controller is configured to determine an identity of the occupant based via information communicated from an authentication device and access a user profile associated with the identity of the occupant. The controller is further configured to identify the chemical in the passenger compartment based on the one or more detection signals from the chemical detection sensor and compare the chemical in the passenger compartment to at least one restricted substance identified in the user profile. The controller is further configured to control a communication indicating the presence of the at least one restricted substance.

These and other aspects, objects, and features of the present disclosure will be understood and appreciated by those skilled in the art upon studying the following specification, claims, and appended drawings. It will also be understood that features of each example disclosed herein may be used in conjunction with, or as a replacement for, features of the other examples.

BRIEF DESCRIPTION OF THE DRAWINGS

The following is a description of the figures and the accompanying drawings. The figures are not necessarily to scale, and certain features and certain views of the figures may be shown exaggerated in scale or in schematic in the interest of clarity.

In the drawings.

DETAILED DESCRIPTION

Figure 1:
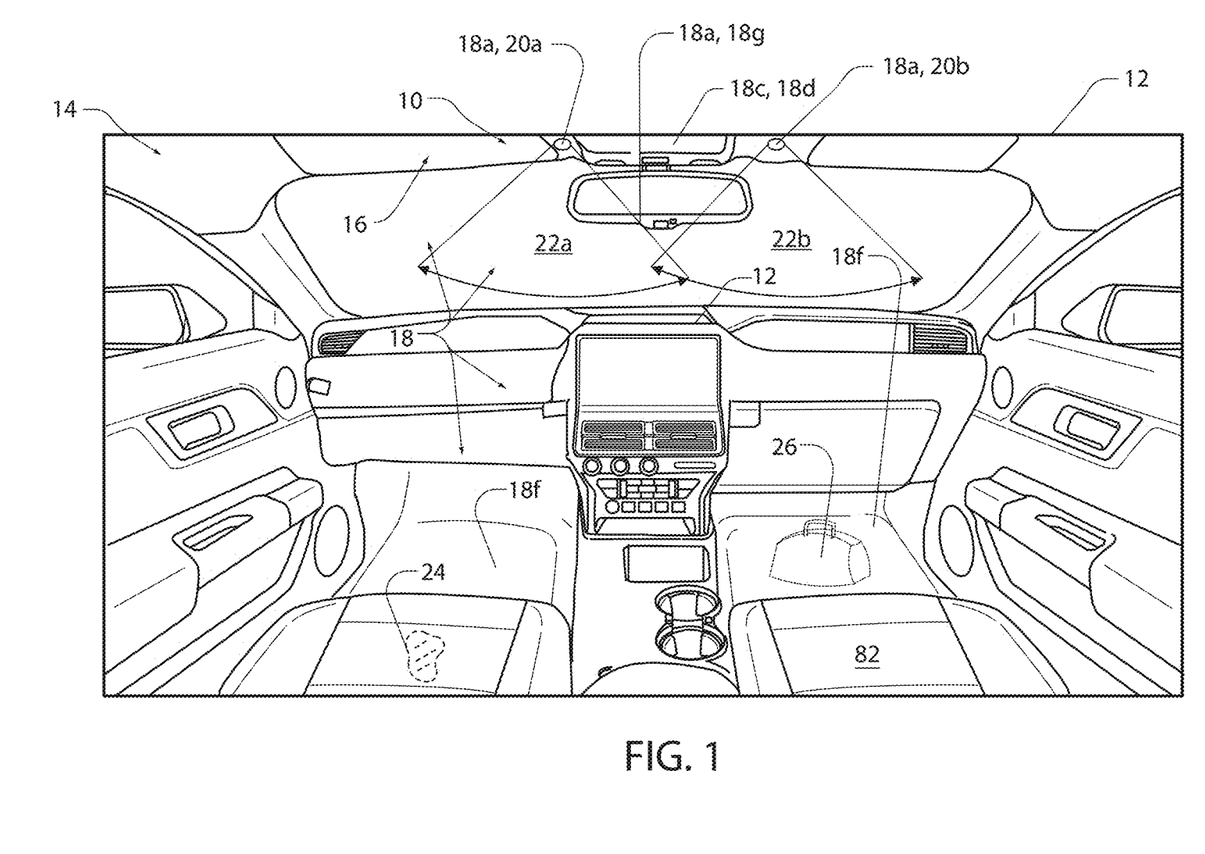
FIG. 1 is a projected view of a passenger compartment of a vehicle comprising a monitoring system comprising one or more detection devices.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
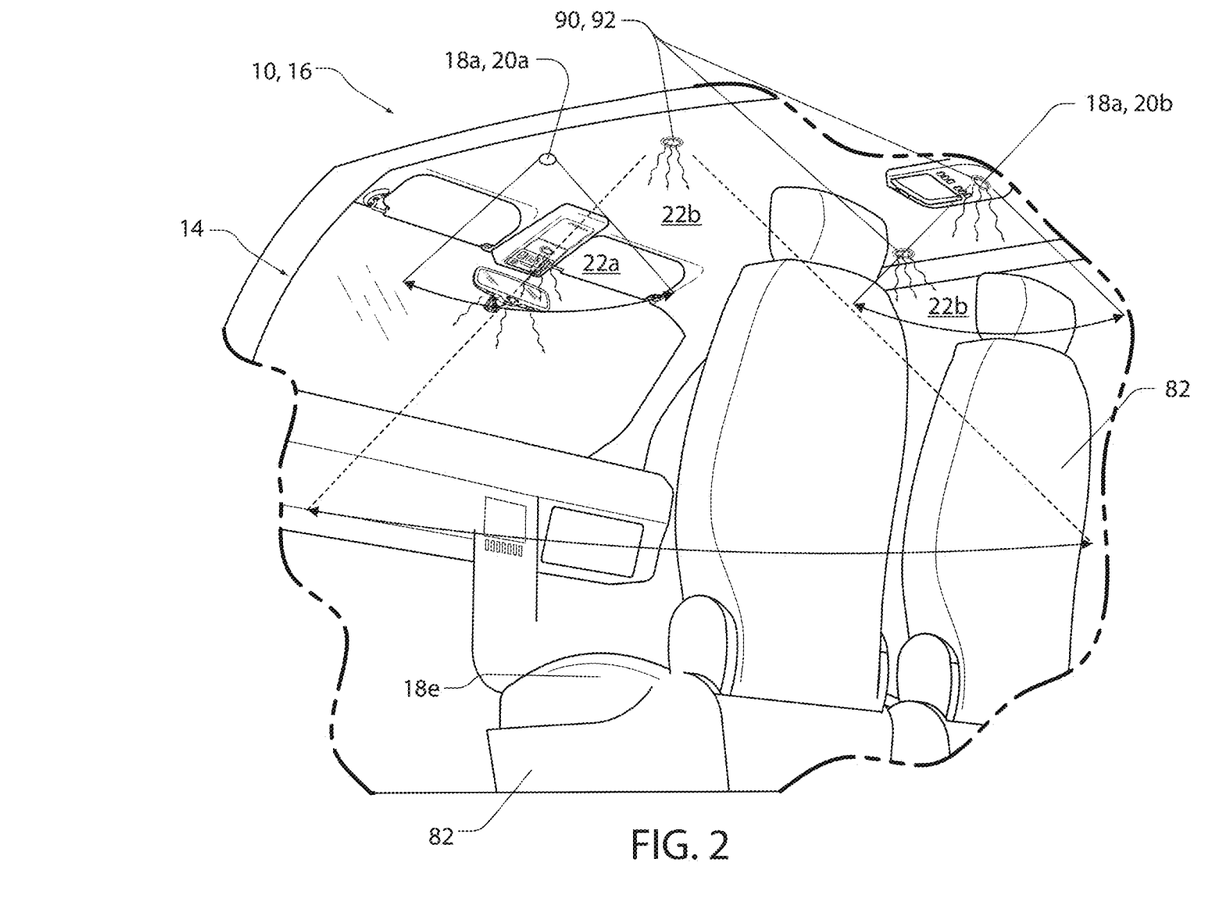
FIG. 2 is a projected view of a passenger compartment of a vehicle demonstrating a disinfection apparatus, which may be implemented in combination with the monitoring system.
Figure 3:
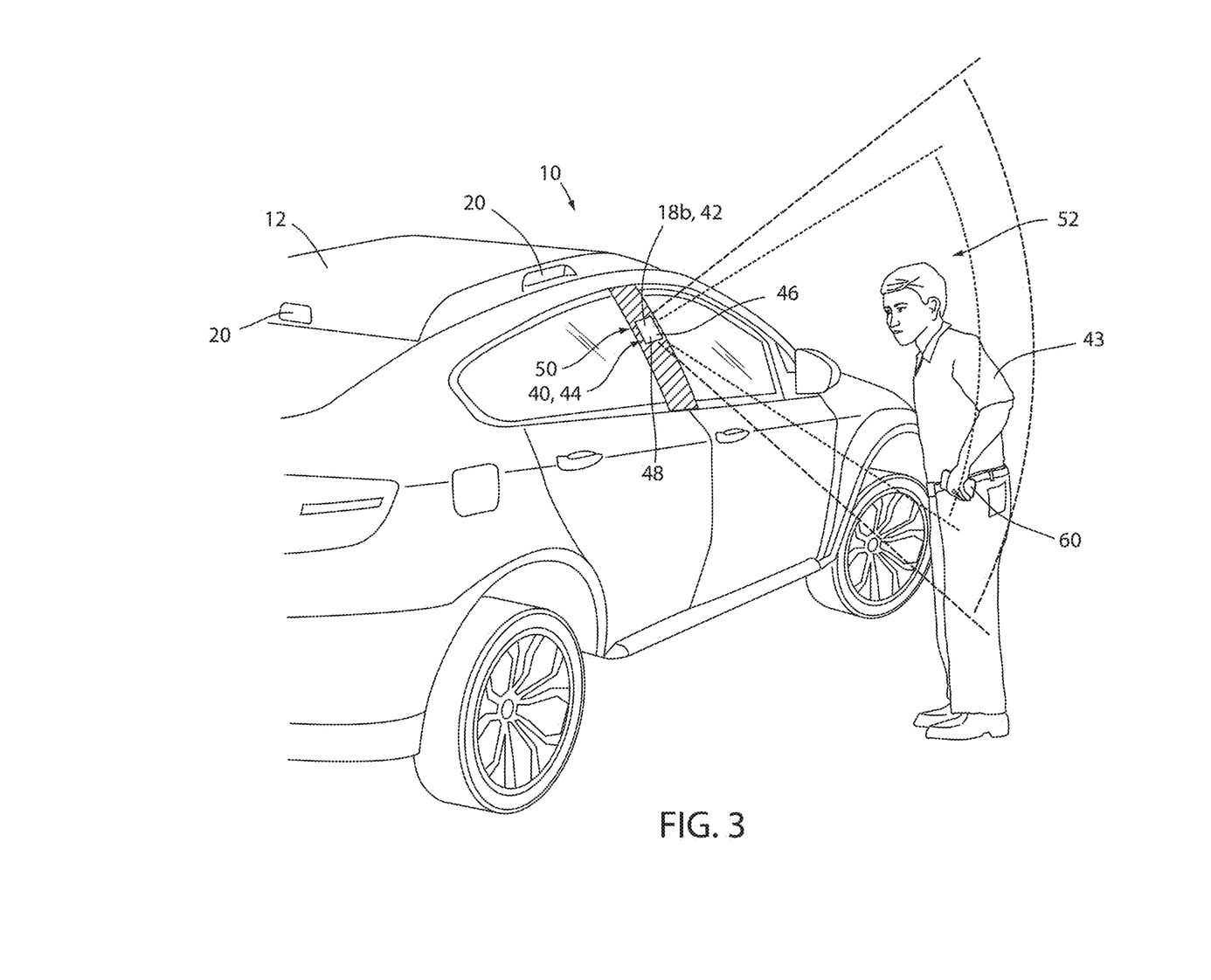
FIG. 3 is a pictorial view of a vehicle comprising an authentication system configured to identify an authorized occupant.

Referring now to FIGS. 1-3, reference numeral 10 generally designates a monitoring system for a vehicle 12. The monitoring system 10 may comprise a plurality of detection devices 18 that may be utilized to detect a condition of a passenger compartment 14 as well as passengers, items or belongings, contaminants, and/or various objects that may be located in the passenger compartment 14. Such conditions or characteristics detected and/or identified in the passenger compartment 14 may generally be referred to as vehicle states. In some embodiments, the monitoring system 10 may be configured to report issues or states related to the condition of the vehicle 12, which may include identifying one or more objects or items 15 that may be left behind in the passenger compartment 14. In some aspects, the monitoring system 10 may even be configured to clean or disinfect the passenger compartment 14 via a disinfection apparatus 16. Accordingly, the monitoring system 10 may provide for a number of beneficial operations that may ensure that the passenger compartment is maintained throughout operation of the vehicle 12.

In operation, the system 10 may be configured to identify a variety of conditions or events via one or more detection devices 18. The detection devices 18 may include, but are not limited to, an imaging system 18a, an authentication system 18b, a chemical detection system 18c, a microphone 18d, weight or pressure sensors 18e, moisture sensors 18f, a proximity sensor 18g, and various additional sensors that may be incorporated in the vehicle 12, some of which are discussed herein. The detection devices 18 may provide for a wide variety of detection functions. The examples discussed in detail relate to cleanliness or contaminant detection, a lost item detection, vandalism or damage detection, and occupant transport monitoring. Though specific examples are discussed herein in reference to the beneficial operations provided by the system 10, it shall be understood that each of the detection devices, features, and/or accessories of the system 10 may be implemented in various combinations to suit a wide range of beneficial applications.

The imaging system 18a may be implemented in a variety of ways. For example, in an exemplary embodiment, the imaging system 18a may comprise at least one image sensor 20 (e.g. 20a, 20b, 20c. etc.), which may be in communication with one or more image processors and/or a memory configured to complete the various processing steps for image data captured in a field of view 22. The image processors may be integrated with or separately provided from a controller of the system 10. As discussed further in reference to FIG. 5, the imaging system 18a may be in communication with a communication circuit, which may be configured to communicate the image data to a remote server or device (e.g. a mobile device) for processing, review, and/or communication in relation to one or more notifications. Accordingly, the imaging system 18a may be configured to process the image data captured by the at least one image sensor 20 to complete various image processing and identification steps to monitor the passenger compartment 14 of the vehicle 12.

In some aspects, the monitoring system 10 may control the imaging system 18a to capture image data in one or more fields of view 22 (e.g. 22a, 22b, 22c, etc.), which may be arranged in affixed arrangement or configured to vary in orientation to scan approximately the entirety of the passenger compartment 14. In this way, the system 10 may be configured to capture image data to identify changes that may be related to damage, contamination or foreign substances 24, and/or items 26 that may be left behind in the vehicle 12. As previously discussed, the detection of the substance 24, the item 26 and/or any other detection by the detection devices 18 may be referred to as the detection and/or reporting of various vehicle states. By comparing the image data in the passenger compartment captured by the one or more image sensors 20 upon a clean inspection relative to an arrival or departure of a passenger, the imaging system 18a may be configured to capture image data documenting changes in the state or condition of the passenger compartment 14 over time. As further discussed herein, such image data may be documented by the system 10 (e.g. by storing image data locally or in a remote server) in order to assign liability and/or ownership to one or more passengers associated with the vandalism, damage, and/or lost items demonstrated in the image data.

In some aspects, the imaging system 18a may further be configured to automatically identify changes in the passenger compartment 14. For example, the imaging system 18a may be configured to process the image data to identify one or more changes that may correspond to damage, contamination, and/or items left behind. Such detection, recognition, and/or identification may be completed by the image processor by processing the image data received from the at least one image sensor 20. In order to process the image data, the image processor and/or a remote server in communication with the system 10 may comprise a plurality of processing modules configured to process the image data by a variety of methods. The processing modules may apply one or more algorithms to identify changes in the passenger compartment 14 including, but not limited to, character recognition, feature extraction, clustering, pattern matching, neural network processing, optical character recognition (OCR), or various other recognition techniques.

In some examples, the at least one image sensor 20 may correspond to a plurality of imaging devices or stereoscopic imaging devices. The at least one image sensor 20 may also correspond to an infrared imaging device, thermal imaging device, or a combination of thermal and conventional imaging devices. The thermal imaging device may correspond to a focal plane array (FPA) utilizing microbolometers as FPA sensors. Accordingly, the image data captured by the system 18a may comprise thermal image data and/or conventional image data in the visible light spectrum. In this way, imaging system 18a may be configured to detect changes in the image data by scanning the passenger compartment 14 in a different wavelength of light (e.g. ultraviolet [UV], infrared [IR], etc.) and compare the image data to identify damage, contamination, and/or lost articles. Similarly, the imaging system 18a may utilize thermal imaging data to identify living creatures or substances that may differ in temperature from the ambient conditions in the passenger compartment. Accordingly, the system 10 may be operable to identify changes and/or detect conditions that may be processed to determine that the passenger compartment 14 is in need of cleaning to remove the substance 24, maintenance to repair damage, and/or that a passenger should be notified of the item 26 is still in the vehicle or available for recovery from the passenger compartment 14. As discussed later in reference to FIG. 5, the passenger may be notified via a mobile device, which may be in communication with a communication circuit of a controller of the system 10.

Similar to the at least one imager 20, the system 10 may similarly implement one or more advanced radar systems that may be directed into the passenger compartment 14 along one or more of the fields of view 22. Such sensors may be configured to detect changes that may not be apparent in the image data as a result of color similarities or other similarities with various surfaces of the passenger compartment. Accordingly, the imaging system 18a may utilize one or more radar detection devices alone or in combination with the at least one image sensor 20 to provide additional information regarding the passengers or contents of the passenger compartment 14.

In some aspects, one or more surfaces of the passenger compartment 14 may be coated with a detection material that may be configured to reflect, luminesce or otherwise provide contrast in the image data captured by the at least one image sensor 20. In such examples, the surfaces of the passenger compartment 14 that may be coated with the foreign substance 24 in the form or dirt, grime, or other contaminants may not reflect with the same intensity of the clean surface of the passenger compartment 14. In this way, the system 10 may be configured to detect changes in the cleanliness or sanitization of the vehicle 12 that may otherwise be too subtle to identify in the image data. Similarly, the monitoring system 10 may detect changes on various surfaces of the vehicle that may be the result of damage and/or vandalism due to changes in the luminescence or reflectance of the surfaces of the passenger compartment upon inspection via the at least one image sensor 20.

Referring now to FIG. 3, in order to identify the passengers or user of the vehicle, the system 10 may further comprise the authentication system 18b. The authentication system 18b may provide for secure access to the vehicle, documentation of passenger identities, travel destinations, and assessment of liability that may result during occupancy. For example, as shown in FIG. 3, an example of an authentication system 18b is shown incorporated on an exterior portion 40 (e.g. a b-pillar) of the vehicle 12. In some aspects, the authentication system 18b may comprise a proximity sensor 42, which may be configured to detect an approaching object or person 43. In response to the object or person 43, a controller of the authentication system 18b may activate a display 44, indicator 46, user interface 48 and/or scanning device 50. The proximity sensor 42 may correspond to a capacitive sensor, a radar sensor, Doppler sensor, ultrasonic sensor, image or light sensor, or various other sensors that may be configured to identify the person 43 or user proximate the vehicle 12.

In some aspects, the authentication system may be configured to identify an identity of the person 43 via a biometric scanning method. In such examples, the authentication system 18b is configured to process the authentication via an eye-scan-identification function. Such a function may utilize infrared illumination of an iris of the person in order to illuminate the eye for the identification. Such illumination may be optimized in conditions allowing for a high optical transmittance in the near-infrared (NIR) range, which may include wavelengths of light ranging from 700 nm to 940 nm. In some embodiments, the range of wavelengths may comprise a range from approximately 700 nm-940 nm. Additionally, in some implementations, the authentication system 18b may comprise a plurality of light sources configured to illuminate at least one iris of the person 43.

To provide for an eye-scan-identification function, for example, an iris scan, an image sensor of the scanning device 50 may be configured to capture image data in a field of view 52 proximate to the vehicle 12. The image sensors as discussed herein may correspond to, for example, a digital charge-coupled device (CCD) or complementary metal-oxide-semiconductor (CMOS) active pixel sensor, although may not be limited to these exemplary devices. Upon capture of the image data of the person 43, the system may process the image data to identify an authorized user and/or communicate the image data to a remote server or database to identify or authenticate the user as being authorized to enter the passenger compartment 14.

In some embodiments, the authentication system 18b may be configured to capture image data that may be displayed on a mobile device 60 (discussed further in reference to FIG. 5) or an access code provided on a permanent form of media. For example, in a ride-share setting, the person 43 or user may be provided with a code that may be displayed on a screen of the mobile device 60. The controller of the authentication system 18b may be configured to control the image sensor of the authentication system 18b to capture image data depicting the code (e.g. a QR code, reference number, or security identifier). The controller of the system 10 may then process the image data to identify whether or not the code corresponds to an authorized user or access of the vehicle 12. In response to an authorized identification of the user or person 43 via the code and/or other authentication (e.g. biometric), the system 10 may be configured to selectively grant access or authorize the use of the vehicle 12.

Similarly, in some implementations, the authentication system 18b may be configured to display a code on the display 44, which may be captured or entered into the mobile device 60 by the user or person 43. Upon receiving or capturing the code, the mobile device 60 may communicate the code to the system via the communication network of the system 10. The code may then be identified and/or authenticated via the remote server and/or directly by the controller of the system 10. In this configuration, the system may be configured to communicate information via the display 44 that may be input into or captured by the mobile device 60 to assist or otherwise facilitate authorized access or use of the vehicle 12. In addition to facilitating access to the vehicle, the authentication of the person 43 may provide for the system 10 to identify an owner of the item 26 and/or assist in the assessment of liability related to repair or cleaning fees required to maintain the vehicle 12.

Figure 4:
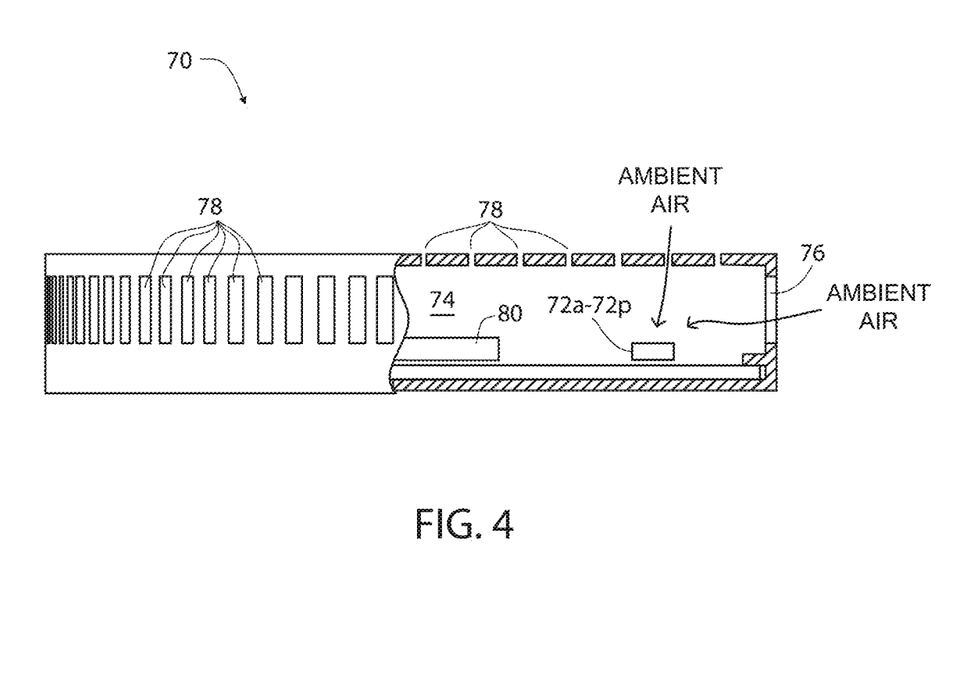
FIG. 4 is a cross-sectional view of a chemical sensor.

Referring now to FIGS. 1 and 4, the system 10 may further comprise a chemical detection system 18c comprising a chemical detection device 70. The chemical detection device 70 may be configured to identify a type and/or concentration of various chemicals in the passenger compartment 14 of a vehicle 12. The chemical detection device 70 may be located in various portions of the vehicle 12 and, in some aspects, may be located in the passenger compartment 14 in an area where air circulates freely. In various aspects, the chemical detection device 70 may correspond to a variety of sensory devices. For example, the chemical detection device 70 may be implemented by a variety of devices including, but not limited to, electrochemical sensors, amperometric gas sensors, carbon monoxide sensors, catalytic bead sensors, thermal conductivity sensors, metal oxide sensors (MOS), infrared (IR) sensors, photoionization detectors (PID), etc. Such sensors may vary in application and, therefore, may be implemented in various combinations to achieve the identification and detection of various chemicals and contaminants that may be present in the passenger compartment. Though specific examples are discussed herein, the chemical detection device 70 may be implemented by similar sensors or developing sensory technologies without departing from the spirit of the disclosure.

In some embodiments, the chemical detection device 70 may comprise at least one nanofiber chemical sensor 72. The nanofiber chemical sensor 72 may be configured to sense various chemicals and compounds that may be present in the ambient air within the passenger compartment 14. In some aspects, the at least one nanofiber chemical sensor 72 may comprise a plurality of nanofiber chemical sensors 72a-72p. In operation, each of the one or more nanofiber chemical sensors 72 may be in communication with a processor 80, which may be configured to monitor changes in electrical characteristics for each of the nanofiber chemical sensors 72 in the presence of the various airborne materials. Based on the combination of signals received from the at least one nanofiber chemical sensor 72, the processor 80 may be configured to identify the presence of one or more contaminants in the passenger compartment 14.

The nanofibers used in the sensors 72 may be synthesized with specific functional groups that can interact with airborne materials/vapors/particles. The nanofibers are deposited on an interdigitated electrode to form an electrode-nanofiber array. Interaction of the nanofibers with airborne materials changes the measured electrical characteristics of the nanofiber chemical sensor. An increase or decrease in the measured current or effective resistance of each of the nanofiber chemical sensors occurs as a result of these airborne material interactions.

Nanofibers of each of the sensors 72 with different functional groups have a different response to the same airborne material. By using the plurality of nanofiber chemical sensors 72 in an array, an identifying response signature can be established by the processor 80 for each of a plurality of airborne materials. Accordingly, based on the electrical signals communicated from the array, the processor 80 may be configured to detect a variety of conditions that may exist in the vehicle 12 and/or the passenger compartment 14. The nanofibers of the sensors 72 may have a proportionately large 3-dimensional surface area that is resistant to particulate fouling. In various aspects, the processor 80 may be configured to identify a variety of contaminants in the passenger compartment 14. In response to the particular contaminant or family of contaminants identified by the chemical detection device 70.

In various aspects, the chemical detection device 70 may be configured to identify a variety of chemicals present in the passenger compartment and/or proximate to the vehicle 12. Chemicals and compounds that may be detected by the device 70 may be trained or programmed based on electrical signatures received by the processor 80 in response to the presence of the chemicals. Examples of chemicals that may be identified and/or detected may include, but are not limited to, Benzaldehyde, Hexane, Acetone, Ethanol, Diesel Fuel, Nitrobenzene, and Formaldehyde. Some examples of explosives and chemical agents that may be detected may include Nitromethane, DNT (Dinitrotoluene), TNT (Trinitrotoluene), ANFO (Ammonium Nitrate Fuel Oil), Ammonium Nitrate, PETN (may detect taggant), RDX (may detect taggant), TATP (Triacetone Triperoxide), $H_2O_2$ (Hydrogen Peroxide), TEP (Triethylphosphate), DMMP (Dimethyl methylphosphonate), 2-Chloroethyl ethyl sulfide, Triphosgene, Methyl Salicylate. Some examples of toxic chemicals that may be detected by the chemical detection device 70 may include, but are not limited to, Chlorine Gas, Ammonia, Hydrogen Peroxide, Sulfur Dioxide, Hydrochloric Acid, TEP (Triethyl Phosphate), Phosphine, Hydrogen Cyanide, Arsine, Formaldehyde. In some examples, the detection device may also be configured to detect one or more chemicals commonly found in consumer foods and/or goods including, but not limited to, Trichloroanisole, Melamine, Trimethylamine, Limonene, Pinene, Linalyl acetate, Menthol, Menthone, Linalool. The device 70 may additionally be configured to detect various amines including, but not limited to, N-Methylphenethylam-lamine, Phenethylamine, Methylamine, Aniline, Triethylamine, and Diethylamine. Accordingly, based on the detection of each of the chemicals detected by the device 70, a controller or control system of the vehicle may provide a corresponding response, which may mitigate an odor, deactivate a vehicle system, output a warning, and/or provide for a variety of beneficial system responses.

Referring now to FIG. 4, the chemical sensors 72a-72p of the chemical detection device 70 may be arranged in any manner and may be disposed in an inner chamber 74 of a housing 76 having a plurality of air vents 78. The air vents 78 may provide for ambient and/or forced air to flow into the inner chamber 74. In this configuration, updated samples of the air present in the passenger compartment 14 may flow passed the chemical sensors 72a-72p providing consistently updated monitoring of the chemical particulates present in the air. In various implementations, the air vents 78 may be large enough and/or numerous enough to allow the ambient air to flow into inner chamber 74 without restriction. A processor 80 of the chemical detection device 70 may be in communication with the system 10 via a wired and/or wireless connection.

Referring again to FIGS. 1 and 4, the chemical detection system 18c may be configured to identify specific contaminants and corresponding concentrations that may be present in the passenger compartment 14. Such contaminants may be categorized generally as those that relate to passenger comfort related considerations (e.g. odors, perfumes, etc.) and those that relate to potentially dangerous chemicals. In operation, the controller 100 of the system may be configured to control a response of the system 10 to mitigate, control, ignore, and/or counteract the effects of various chemicals that may be detected by the chemical detection device 70. In various examples, a controller of the system 10 may be configured to control various vehicle systems and accessories in response to the specific type of chemical, a family of chemicals, and/or general category (hazardous versus non-hazardous) of the chemicals detected by the chemical detection device 70. In this way, the system 10 may be configured to provide a specific and/or configurable response to resolve the concerns related to the detection of specific chemicals and/or categories of chemicals.

Common chemicals and corresponding odors that may be detected by the device 70 may vary widely. For example, the device 70 may be configured to identify a variety of odors including, but not limited to, perfumes, feces, fish, skunk, pet odor, decaying biological material, methane, hydrogen sulfide, body odor (body-related bacterial odor), smoke, alcohol, bodily fluids, vomit, etc. Some of these odors may relate to comfort issues while others could present health issues to one or more passengers of the vehicle 12. Accordingly, the detection device may additionally communicate a concentration of the chemicals detected in the vehicle to the controller 100. According to the desired configuration, the controller 100 may respond to an indication of the presence of a chemical at a reported level in a variety of ways.

Additionally, the chemical detection device 70 may be configured to detect and identify a variety of chemicals that may generally be considered dangerous which may or may not cause a significant odor. Examples of such chemicals or sources of such chemicals may be allergens including, but not limited to, peanuts, soy, perfumes, smog, etc. Additional examples of chemical or sources of such chemicals may include, but are not limited to, explosives, gun powder, accelerants, carbon dioxide, carbon monoxide, volatile organic compounds (VOCs), drugs (e.g. methamphetamine, alcohol), smog, smoke, exhaust, etc. In response to the detection of such chemicals, the system 10 may respond in different ways, particularly in comparison to the detection of chemicals that may not be dangerous in relation to vehicle operation or passenger health.

Still referring to FIG. 1, as previously discussed, the detection devices 18 may further comprise the microphone 18d, pressure/weight sensors 18e, moisture sensors 18f, and/or proximity sensors 18g. In some aspects, the pressure/weight sensors 18e may be disposed in one or more of a plurality of passenger seats 82 and/or the suspension, tires, frame, or various load-bearing components of the vehicle 12. In response to changes in the weight or force applied to one or more of the pressure/weight sensors 18e, a controller of the system 10 may be configured to identify the presence of a passenger and/or the item 26 in the vehicle 12. In some examples, the weight of the vehicle 12 may be detected prior to providing access to the passenger compartment 14. Accordingly, the system 10 may monitor variations in the weight of the vehicle 12 as detected by the pressure/weight sensors 18e to identify that the vehicle 12 is occupied by a person and/or the item 26. In this way, the system 10 may be configured to identify the presence of a passenger in the vehicle 12 and/or verify a detection via one or more additional detection devices 18 as discussed herein.

Referring now to FIG. 2, the system 10 may further comprise the disinfection apparatus 16. The disinfection apparatus may comprise a plurality of light sources 90 and/or spray ports 92 that may be configured to emit wavelengths of germicidal light and spray one or more disinfectant sprays. The system 10 may be configured to selectively activate the disinfection apparatus 16 in response to the detection devices 18 indicating that the passenger compartment 14 is not occupied by a person or living creature. Accordingly, in response to identifying the occupancy of the passenger compartment 14, a controller of the system activates a germicidal emission of the germicidal light to sterilize bacteria that may occupy the contaminated region. As discussed herein, the selective illumination of a control region 92 or other areas of the passenger compartment 14 may be illuminated by selectively activating the light sources 90 and adjusting the intensity, focus, and/or origin from where the germicidal emission is emitted. The germicidal emission may comprise wavelengths of light ranging from approximately 260 nanometers to about 270 nanometers. Such wavelengths may be emitted from one or more of the light sources 90, which may include mercury-based lamps, UV-LEDs (UV-C LED) lamps, and/or pulsed-xenon lamps.

Figure 5:
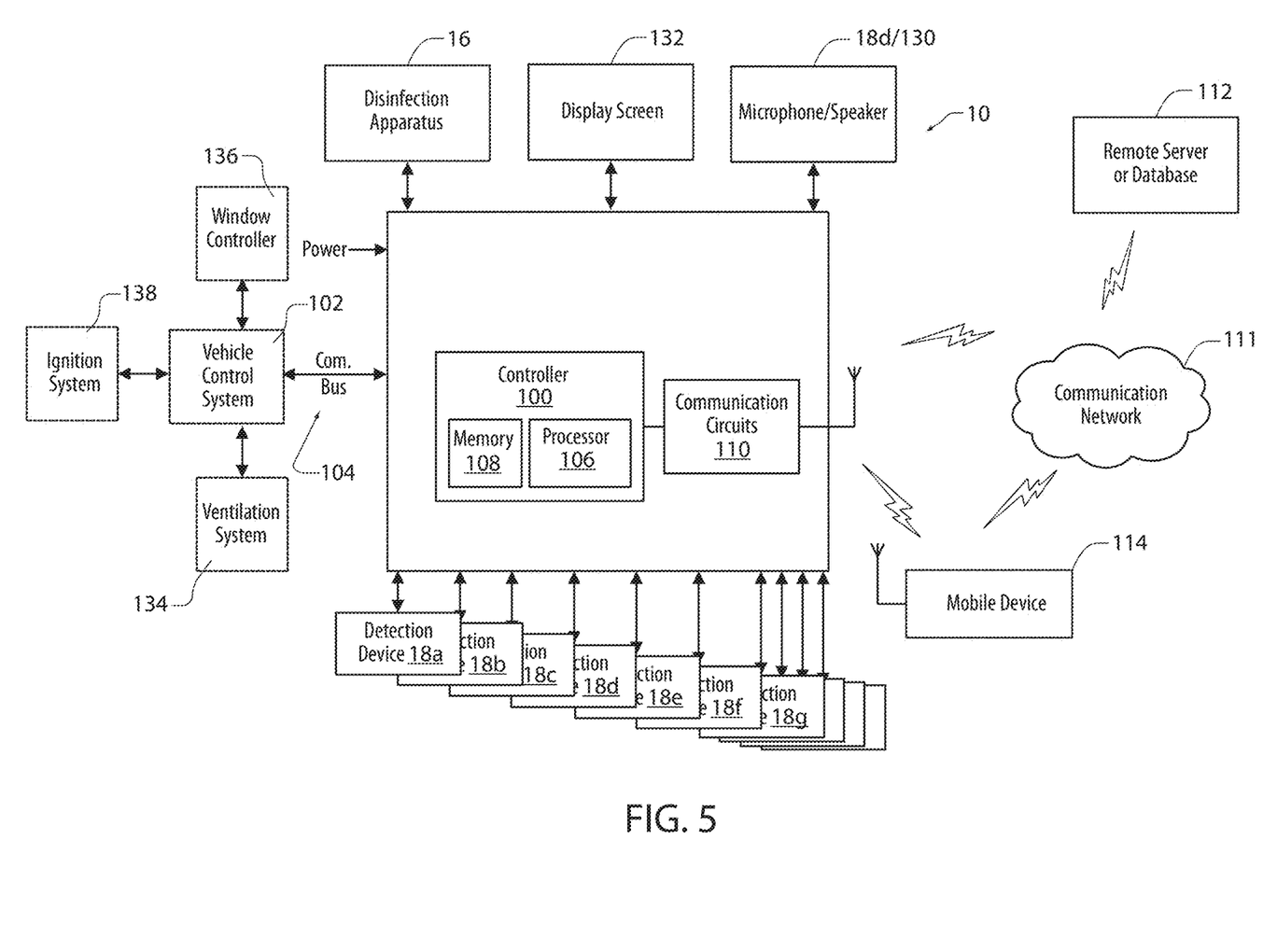
FIG. 5 is a block diagram demonstrating a vehicle monitoring system in accordance with the disclosure.

Referring now to FIG. 5, a block diagram of the system 10 comprising the detection devices 18 is shown. The system 10 may comprise a controller 100 of the monitoring system. In FIG. 4, the controller 100 of the system 10 is shown in communication with the each of the detection devices 18a-18g. The controller 100 may further be in communication with a control module 102 via a communication bus 104 of the vehicle 12. The communication bus 104 may be configured to deliver signals to the controller 100 identifying various states of the vehicle 12. For example, the controller 100 may be configured to control a variety of vehicle functions via the communication bus 104. For example, the controller may control or communicate an input configured to initiate control of an ignition state, a door or window control status (e.g. open/closed configuration), activation of lighting devices, audible alerts (e.g. horn operation), hazard indications, etc. Such control signals may be submitted from the controller 100 to control various systems of the vehicle 12 via the communication bus 104 or any form of communication (e.g. wired, wireless).

The controller 100 may comprise a processor 106 having one or more circuits configured to control various operations of the system 10. The processor 106 may be in communication with a memory 108 configured to store instructions to control operations of the detection devices 18 and control various vehicle systems in response to the detections via the detection devices 18. For example, the controller 100 may be configured to store one or more control responses configured to control various systems of the vehicle in response to the detection of one or more chemicals by the detection devices 18.

In some embodiments, the controller 100 may further comprise one or more communication circuits 110 configured to communicate via a communication network 111. Accordingly, the system 10 may be in communication with a remote server 112 and/or a mobile device 60 via the communication network 111. The communication network 111 may comprise one or more wireless or wired network interfaces or communication protocols. As discussed herein, wireless communication protocols may operate in accordance with communication standards including, but not limited to, the Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multipoint distribution systems (LMDS); multi-channel-multi-point distribution systems (MMDS); RFID; and/or variations thereof. In this configuration, the controller 100 may be configured to send an alert or message to the mobile device 60 and/or the remote server 112 identifying a detection of a chemical related to the operation of the vehicle 12 and/or a chemical present in the passenger compartment 14. The alert or message may correspond to a text message, data message, email, alert via an application operating on the mobile device 60, etc.

The system 10 may further be in communication with the microphone 18d and/or a speaker 130. In such embodiments, the system 10 may be configured to communicate one or more warnings, instructions, and/or additional information to a user in response to the detection of one or more states of the vehicle as detected by the detection devices 18. Additionally, the system 10 may be configured to initiate an emergency communication (e.g. a telephonic communication) from the vehicle 12 in response to the detection of a potentially hazardous chemical or situation identified by the detection devices 18. In some aspects, the controller 100 may further be in communication with a display screen 132, which may be disposed in various portions of the vehicle 12 for display of images and graphics. Accordingly, the system 10 may provide for the controller 100 to display instructions and/or warnings related to the detection of one or more states, events, chemicals, etc. that may be detected by the detection devices 18.

Passive and Vehicle Related Functions

As discussed herein, the system 10 may operate in a passive configuration, wherein the controller 100 is configured to report the identification of chemicals or states detected by the detection devices via one or more alerts in the vehicle 12 and/or communications to the remote server 112 and/or a mobile device 60. In such aspects, the system 10 may communicate the presence of foreign substances 24, the left behind item 26, damage, and/or chemicals detected by the detection devices 18 to a user or administrator of the vehicle 12 so that proper corrective action may be taken. As previously discussed herein, the detection of various characteristics that may be detected by the detection devices herein may generally be referred to as vehicle states. For example, a notification may be communicated from the controller 100 to the mobile device 60 indicating that there is an odor related to a specific chemical or family of chemicals that should be investigated by a user of the vehicle 12 to limit odor or for maintenance purposes. Accordingly, indications to the remote server 112 and/or a mobile device 60 may be communicated from the controller 100 of the system 10 in response to the detection of the various vehicle states identified by the detection devices 18.

In response to the detection of a state of the vehicle 12 as identified by the sensors, the controller 100 may respond in a variety of ways. For example, in response to the detection of a first state (e.g. an odorous chemical presence identified by the chemical detection system 18*c*), the controller 100 may control a vehicle heating, ventilation, and air conditioning (HVAC) or ventilation system 134 to activate an active filter or air purifier, which may be in connection with an air circulation path or air supply port. Air purifiers that may be utilized may include active UV-C air filters, ionizers, and other types of filters. Additionally, in response to a second state, the controller 100 may be configured to activate fresh air ventilation of the ventilation system 134 such that fresh air is drawn into the cabin. In this way, the system 10 may dilute a concentration of the second chemical in passenger compartment 14 to mitigate any discomfort related to the presence of the chemical. In some aspects, in response to a third state, the controller 100 may be configured to control a window controller 136 to open the passenger compartment 14 to ventilate.

Accordingly, the system 10 may provide for a different response in response to detection of each of a plurality of states identified in the passenger compartment 14 of the vehicle 12. Though specific states (first, second, third, etc.) are discussed in reference to the corrective actions (e.g. ventilation, filtration, maintenance, disinfection, etc.), it shall be understood that the controller 100 may be configured to apply various corrective actions alone or in combination based on a desired configuration of the system 10. For example, in response to the detection of the first state, the controller 100 may activate the ventilation system 134 and control the window controller 136 to open one or more windows of the vehicle 12.

In some aspects, the system 10 may be configured to suppress or deactivate a vehicle ignition 138 in response to a detection of a state of the vehicle 12 identified by one or more of the detection devices 18. The controller 100 may additionally activate an alarm or warning, which may be displayed on the display screen 132 or indicator of the vehicle 12. In some aspects, an instruction may be provided by the alarm or alert, which may instruct a passenger of the vehicle 12 to deactivate or seek maintenance for the vehicle 12. As previously discussed, the control of the vehicle ignition 138, the alarm, and various devices may be configured based on a desired response, which may be tailored to a user, a particular vehicle, geographic region of operation, etc. Accordingly, the system 10 may be configured in a variety of ways to provide control instructions to a variety of vehicle accessories and/or devices.

In some aspects, the configuration of the system 10 may be configured based on one or more standard warnings, which may relate to the detection of generally dangerous chemicals. Additionally, the system 10 may be configured to provide custom alerts, detections, or corrective actions based on specific allergies, chemicals, and/or odors that a user indicates as being problematic. For example, if an individual has a specific allergy (e.g. peanuts, tree nuts, soy, etc.), the system 10 may be selectively configured to alert at a user-defined detection level in response to the detection of the chemicals related typically identified in relation to the allergen by the chemical detection system 18*c*. In this way, the system 10 may provide for customized controls to assign alerts in response to any chemicals or states that may be detected by the detection devices 18 as discussed herein.

Cleanliness Detection Sterilization

In some examples, the system 10 may be configured to detect contamination (e.g. the foreign substance 24) located in the passenger compartment 14. The substance 24 may be identified in response to a detection by the imaging system 18*a*, the chemical detection system 18*c*, and/or any of the detection devices that may identify or detect the substance 24. In response to the detection, the system 10 may first identify whether a passenger is in the passenger compartment 14. If the compartment 14 is not occupied, the system 10 may activate the disinfection apparatus 16 to treat the passenger compartment by activating the plurality of light sources 90 and/or spray ports 92 to emit wavelengths of germicidal light and spray one or more disinfectant sprays. Following the disinfection via the disinfection apparatus 16, the system 10 may repeat the scan via the detection devices 18. If the substance 24 is effectively neutralized and/or removed from the passenger compartment 14, the system 10 may maintain the service of the vehicle 12 to transport additional passengers. However, if the substance 24 is still present, the system 10 may trigger an additional review of the passenger compartment 14, which may comprise a visual review of image data by a person via a remote server prior to returning the vehicle 12 to service. Additionally, the system 10 be configured to instruct the vehicle 12 to be returned to a predetermined or communicated maintenance location that may be in a local region of the vehicle 12. In this way, the system 10 may provide for the detection of a state or condition of the vehicle 12. Based on the detection, the system 10 may be configured to correct for the condition and/or request that the vehicle 12 be returned to a maintenance center.

In some examples, the system 10 may be configured to detect behavior that may suggest a contamination issue. For example, in some instances the system 10 may be configured to detect sounds including coughing, sneezing, sniffling, and/or other sounds that may be associated with an infection or illness via the microphone 18*d*. In this way, the controller 100 of the system 10 may similarly identify a particular contaminant in the passenger compartment 14 of the vehicle 12. In response to the detection, the system 10 may similarly respond by disinfecting the passenger compartment via the disinfection apparatus 16, report the potential contamination via the communication circuit 110, and/or request that the vehicle 12 be returned for cleaning.

In some embodiments, the system 10 may be configured to detect snow, water, or various liquid contaminants that may accumulate on a floor or surface of the passenger compartment 14. Such contaminants may be detected similarly to the substance 24 as discussed herein. Additionally, the contaminants may be detected by a moisture or humidity sensor, which may correspond to yet another detection device 18*h*, which may be positioned in the passenger compartment 14 proximate a floor or in various locations. In response to the detection of the moisture, the controller 100 of the system 10 may be configured to activate one or more heaters to heat the passenger compartment 14 and/or directly heat the floor where the moisture has accumulated. In this way, the system 10 may also detect and remediate the accumulation of water and moisture.

Lost Item Detection

As previously discussed, the monitoring system 10 may be configured to detect the item 26 left behind in the vehicle 12 via the imaging system 18*a* or various additional detection devices 18 discussed herein. In response to detecting the item 26 in the passenger compartment, the system 10 may respond in a number of ways. For example, the system 10 may be configured to communicate a message to a mobile device of the passenger associated with the item 26 via the communication circuits 110. That is, based on the time of occupancy of a passenger in combination with the time of identification of the item 26, the controller 100 may infer that the item 26 belongs to the passenger immediately preceding the identification. In such cases, the system 10 may communicate a message, image data depicting the item 26, and/or provide an audible or visual alert from the vehicle 12 that the item is located in the vehicle 12 following the departure of the passenger. Again, the departure may be determined based on a detection via one or more weight sensors, a door sensor, the imaging system 18*a*, and/or various additional devices discussed herein.

In some embodiments, the system 10 may provide options to the previous passenger and likely owner of the item 26 for pickup and/or delivery of the item 26. For example, the system may be configured to return the vehicle 12 to a location of the previous passenger for retrieval, provide an alert via the mobile device 60, arrange for retrieval at a service or storage center, and/or arrange for return shipment of the item 26. Each of these options may be provided to the user via the mobile device 60 or any other form of communication device. Accordingly, the system 10 may provide for the valuable service of identifying the item 26 and, in some instances, may further be configured to arrange for return of the item 26.

Occupant Transport Monitoring

In some examples, the system 10 may be configured to monitor the pickup and drop-off locations of one or more passengers. Such a procedure may be achieved in a variety of ways. For example, the system 10 may be configured to detect the identity of the person 43 accessing the vehicle 12 via the mobile device 60 and/or the authentication system 18*b*. Once the identity of the person 43 is identified, the system may track a weight differential before and after the passenger has entered the passenger compartment 14. The variations in pressure or weight in the passenger compartment 14 may be detected in response to the pressure/weight sensors 18*e* communicating changes to the controller 100 of the system 10. In this way, the weight of the vehicle 12 or in various portions of the passenger compartment may be detected by the system 10 in order to confirm that the person 43 has entered or exited the vehicle 12. In addition to the variations in weight, the controller 100 may additionally detect a geographic location (e.g. via a GPS device) to identify a location of the vehicle 12 wherein the change in weight occurred. Similarly, an application operating on a mobile device 60 of the occupant may be configured to report a GPS location confirming the location of departure from the vehicle 12. In these ways, the system 10 may determine whether the person 43 accessed the vehicle 12 the corresponding boarding and departure locations of the person 43. In some examples, the controller 100 may further verify or detect the occupancy of the vehicle 12 via the imaging system 18*a*, which may document image data, process facial recognition or various other detection activities for identifying the passengers. Additionally, the system 10 may be configured to process data from the proximity sensor 42, which may indicate movement away from the vehicle 12 prior to boarding that may correspond to a passenger swap or unauthorized passenger loading.

In some examples, the system may additionally be configured to detect whether a passenger or occupant is secured in the vehicle by a safety restraint (e.g. seatbelts—not shown). For example, in addition to conventional monitoring techniques for monitoring the use of safety restraints, the system 10 may further provide for detection and verification of the usage of a safety restraint via one or more of the detection devices 18 as discussed herein. In some examples, the system 10 may detect usage of the seatbelt based on an identification in the image data captured by the at least one image sensor 20*a* of the imaging system 18*a* in combination with a seatbelt latch detection. Additionally, each of the safety restraints may comprise a reflective material that may be configured to reflect one or more wavelengths of light that may be detected by the imaging system 18*a*. In this configuration, the system 10 may be configured to identify if the reflective material is masked from a field of view (e.g. 22*a*) of the at least one image sensor 20*a* by a body of a passenger. In this configuration, the system may be configured to utilize the pressure/weight sensors 18*e* in seats of the vehicle 12 in combination with the seatbelt latch detection and the imaging system 18*a* to ensure that a passenger sitting on a seat that reports a weight detection is not sitting on top of the seatbelt in a latched configuration.

In some examples, the system 10 may additionally comprise a sensor configured to identify a proximity between the seatbelt and the seat. In such an example, a sensor may be disposed in the seat or on the seatbelt. In response to a distance between the seat and the seatbelt being less than a predetermined threshold, the system 10 may determine that a person is not secured between the seatbelt and the seat. Similarly, the sensor may be configured to measure a signal strength between an emitter and a receiver disposed on the seat and the seatbelt. Such a sensor may detect a presence of a passenger secured via the restraint between the seatbelt and the seat in response to a signal strength detected by the receiver being less than a predetermined threshold. That is, the system 10 may infer that the passenger is secured by the seatbelt by identifying that a body is positioned between the seatbelt and the seat. In combination with the pressure/weight sensor 18*e* and/or the imaging system 18*a*, the system 10 may utilize the detection devices 18 to detect the occupancy and that the passengers are each effectively secured by the safety restraints in a variety of ways.

It will be understood by one having ordinary skill in the art that construction of the described device and other components may not be limited to any specific material.

Other exemplary aspects of the device disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary aspects is illustrative only. Although only a few aspects of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary aspects without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated aspects only. Modifications of the device will occur to those skilled in the art and to those who make or use the device. Therefore, it is understood that the aspects shown in the drawings and described above is merely for illustrative purposes and not intended to limit the scope of the device, which is defined by the following claims as interpreted according to the principles of patent law, including the Doctrine of Equivalents.

What is claimed is:

1. A detection system for a vehicle comprising:
   at least one detection device configured to detect conditions in a passenger compartment of the vehicle; and
   a controller in communication with the at least one detection device, wherein the controller is configured to:
   determine an identity of the occupant;
   monitor data from the at least one detection device prior to an entry of an occupant;
   access a user profile based on the identity of the occupant, wherein the user profile comprises an indication of one or more restricted substances, and wherein the one or more restricted substances comprise a substance to which the profile indicates an exposure warning for the occupant; and
   control an occupancy authorization for the vehicle in response to the exposure warning.

2. The system according to claim 1, wherein the at least one change indicates at least one of an item left behind in the passenger compartment, damage to the vehicle, and contamination of the vehicle.

3. The system according to claim 1, wherein the at least one detection device comprises a chemical detection sensor configured to detect a chemical in the passenger compartment, wherein the controller is further configured to identify the substance associated with a contamination of the vehicle.

4. The system according to claim 3, wherein the controller is further configured to determine a response to the contamination based on the identity of the chemical.

5. The system according to claim 3, wherein the response comprises at least one of reporting an allergen in the passenger compartment and identifying a cleaning request for the vehicle.

6. The system according to claim 1, wherein the controller is further configured to:
   identify the identity of the occupant based on a scan via an authentication device.

7. The system according to claim 6, wherein the controller is configured to grant entry to the occupant in response to the identity matching an authorized passenger.

8. The system according to claim 1, wherein the one or more restricted substances comprise a substance identified in the user profile to which the occupant is allergic.

9. The system according to claim 1, wherein at least one of the detection devices comprises an image sensor configured to capture image data in the passenger compartment.

10. The system according to claim 9, wherein the controller is further configured to:
    document a change identified in the image data that occurred during the occupancy of the occupant.

11. The system according to claim 10, wherein the change indicates damage to the passenger compartment of the vehicle.

12. The system according to claim 10, wherein the change indicates an item left behind in the passenger compartment following the occupancy of the passenger.

13. The system according to claim 12, wherein the controller is further configured to:
    output a message communicating a notification of the item left behind to the passenger.

14. A detection system for a vehicle comprising:
    at least one detection device configured to detect conditions in a passenger compartment of the vehicle, wherein the at least one detection device comprises a chemical detection sensor configured to detect a chemical in the passenger compartment; and a controller in communication with the at least one detection device, wherein the controller is configured to:
- determine an identity of the occupant based on information communicated from an authentication device;
- access a user profile associated with the identity of the occupant;
- identify the chemical in the passenger compartment based on the one or more detection signals from the chemical detection sensor;
- compare the chemical in the passenger compartment to at least one restricted substance identified in the user profile; and
- control a communication indicating the presence of the at least one restricted substance.

15. A detection system for a vehicle comprising:
- a detection sensor configured to detect a chemical in the passenger compartment; and
- a controller in communication with the detection sensor, wherein the controller is configured to:
  - monitor data from the detection sensor;
  - identify a type of substance associated with a contamination of the vehicle based on the data from the chemical detection sensor; and
  - determine a response to the contamination based on the type of the chemical, wherein the determined response is selected based on the type of the chemical.

16. The detection system according to claim 15, wherein the determined response is selected from:
- activating an allergen restriction based on a user profile in response to the type of the chemical;
- activating a comfort restriction based on the user profile in response to the type of the chemical; or
- activating a cleaning request for the vehicle in response to the type of the chemical.

17. The detection system according to claim 16, wherein the user profile is identified based on a passenger request for the vehicle.

18. The detection system according to claim 17, wherein the user profile is identified in response to an authentication of the passenger prior to granting access to the vehicle.

19. The detection system according to claim 16, wherein the user profile identifies one or more restricted substances associated with the type of the chemical and activates the allergy restriction for a passenger in response to the detection of the one or more restricted substances.

20. The detection system according to claim 16, wherein the user profile identifies one or more restricted substances associated with the type of the chemical and activates the comfort restriction for a passenger in response to the detection of the one or more restricted substances.

* * * * *